Oct. 24, 1933.  M. G. MARKLE ET AL  1,931,502
TESTING DEVICE
Filed Sept. 11, 1931
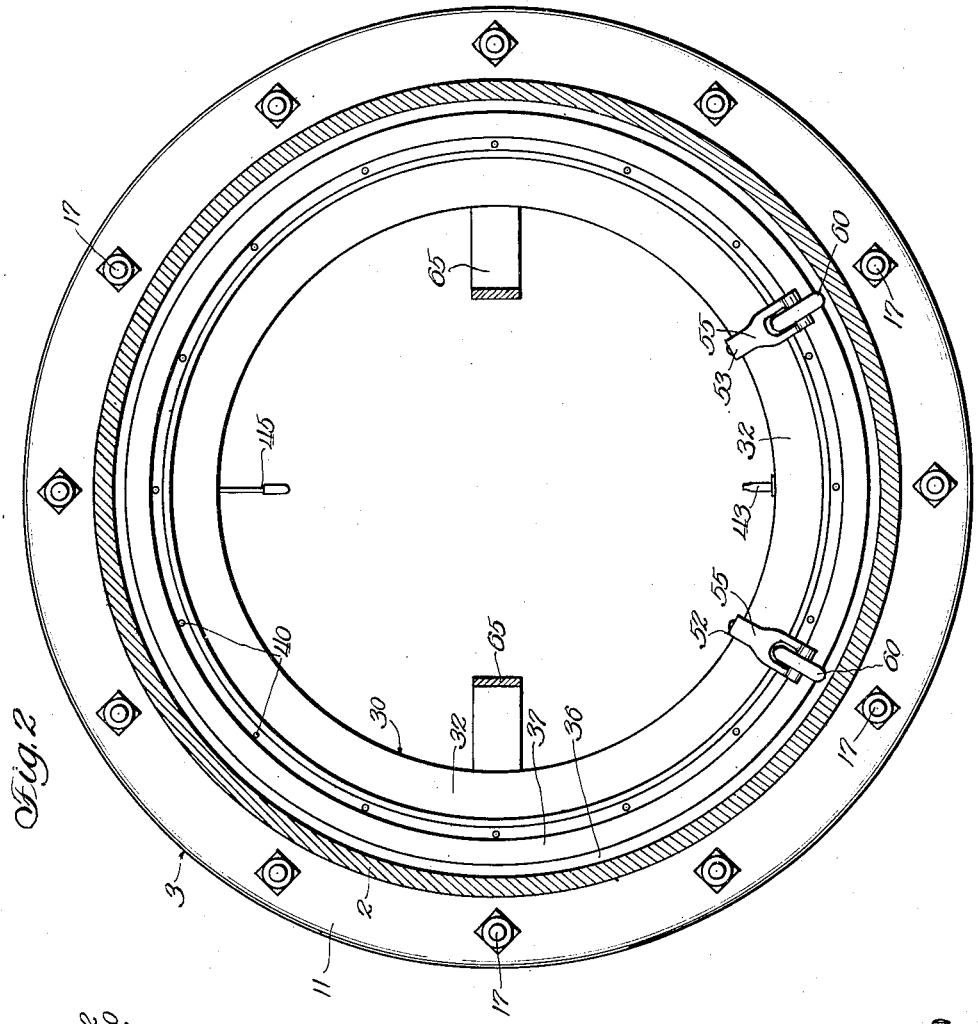
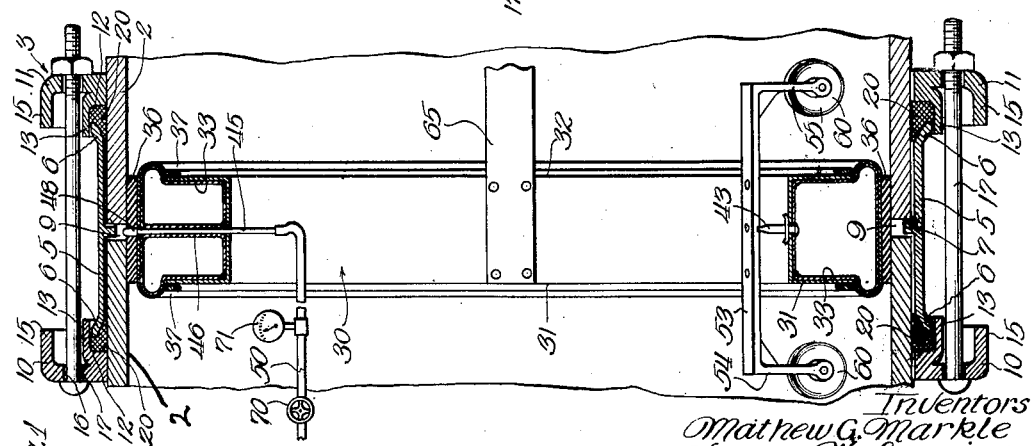
Inventors
Mathew G. Markle
James W. Leeming
By Brown, Jackson, Boettcher & Diemer
Attys.

Patented Oct. 24, 1933

1,931,502

UNITED STATES PATENT OFFICE 1,931,502

TESTING DEVICE

Matthew G. Markle and James W. Leeming, Chicago, Ill.

Application September 11, 1931
Serial No. 562,236

9 Claims. (Cl. 137—77)

The present invention relates generally to testing devices and is particularly concerned with the provision of a new and useful apparatus for testing pipe joints.

In the construction of pipe lines it is extremely important to be able to test the line for defects, particularly leakage, before the line of pipe is covered. Little trouble is experienced in leakage through the walls of individual pipe sections or lengths, as they may be tested for tightness before being laid or joined, but the opposite is the case with the pipe joints between adjacent pipe sections. There are numerous ways of joining pipe or tube ends which if properly applied will provide gas tight joints, but it is difficult to determine whether tightness has been secured without a test. Due to the great expense and trouble which would be involved in locating and repairing defective joints after the line has been laid in the ground and covered, it is desirable to be able to test each joint for leakage before the same is covered.

One method with which we are familiar involves the connection of a plurality of pipe sections by suitable joints followed by the step of plugging or otherwise rendering leak tight the ends of such completed line and then testing this line for leakage by subjecting the same to pressure. This method will serve where a line of at least several pipe sections can be laid and left exposed so that should the subsequent test reveal a defective joint or connection the same can be readily repaired, after which the entire line can be properly covered.

One of the principal objections to this method, particularly where the pipe sections are bolted together, is that it is hazardous. Usually the portion of the line being tested is closed at the end by plugs and not infrequently during a test of a line the end plugs blow out injuring one or more of the workmen, particularly where the pipe sections are of considerable diameter or where the testing pressure is relatively high. Not only is the operation of blocking off or closing the ends of the line quite expensive, particularly because it is necessary to repeat the test a number of times, but it is also relatively difficult to secure and maintain a tight closure. By the use of the present invention the need for closing off the portion being tested is entirely eliminated.

Where the pipes are joined by welding such blocking off is not performed but it is necessary to weld plates at each end of the section to be tested and while this is not as hazardous as blocking off the ends it also entails several additional operations which are rendered unnecessary by the present invention, so that by the use of the present invention the cost of laying a pipe line is materially reduced.

In addition, the above method can be employed only where there are no objections to leaving a considerable section of the pipe line exposed and also where there are no objections to leaving a considerable line of cut or excavation exposed.

In congested areas such as towns and cities and along highways and the like it is often not permissible to leave excavations open and exposed due to the danger of causing accidents and personal injuries.

Another grave objection to such method of testing is that in order to subject the joints to any suitable testing pressure the entire section must be pumped up to that pressure. That is slow, expensive and wasteful of power, particularly upon large mains.

With the above requirements and factors in mind, the present invention contemplates a method and means for testing each pipe joint individually as the line is being laid, which tests can be performed without requiring any material portion of the line or the excavation to remain exposed for any length of time. Neither is it necessary to pump up any appreciable volume. More particularly, the present invention has for its principal purpose the provision of a means and method for testing the joints between adjacent pipe sections, which sections are connected together by an exterior joining means leaving the interior of the pipe line substantially smooth and uninterrupted, as is desirable in the construction of gas mains and the like.

The present invention contemplates the provision of means for closing or walling off the small space between the adjacent ends of the pipes from the interior of the pipe line or conduit, or otherwise sealing off only sufficient part of the adjacent ends to permit the application of testing pressure to the joint, and then subjecting said space which lies between the sealing off means, the adjacent ends of the pipe and the exterior joining means to a substantial increase in pressure, as by the application of a testing fluid under pressure, the escape of such fluid serving to give notice that the joint under test is defective.

Such escape of the testing fluid can be made manifest in a number of ways. The testing fluid may have a characteristic odor, appearance or color, but preferably air is used as the testing fluid since quantities of air under comparatively high pressures are usually available in the construction of such pipe lines and the like and the escape of air through a defective joint is made manifest exteriorly of the joint by the application of some sort of bubble forming liquid, such as a soap solution, to the exterior surface of the adjacent pipe ends and the connecting exterior joint means. When the space between adjacent pipe ends is subjected to air pressure and the soap solution is applied to the exterior of the pipe line any escape of the air immediately forms bubbles which disclose the presence of a leak.

In carrying out the above principles the present invention contemplates a convenient manner of sufficiently sealing off the space between the pipe ends or the inside connection of the joint so that the testing pressure can be properly applied to a joint. The present invention contemplates the application of a flat strip or mat of resilient material to the adjacent pipe ends and overlapping the same. As a preferred means for tightly pressing this strip or cylindrical section to the adjacent pipe ends the present invention contemplates providing a rim which carries an inflatable air bag, the latter carrying the flexible strip or tread on its outside circumferential portion or periphery so that when the air bag is inflated the strip of flexible material is yieldingly pressed against the adjacent pipe ends.

Preferably, the rim, air bag and flexible mat or strip are all connected together to form a conveniently handled unit, air pressure through one connection being used to inflate the air bag or tube to provide the seal and air pressure preferably through another connection being used to secure the testing pressure referred to above.

The present invention also contemplates in connection with such a testing unit the provision of supporting rollers and convenient handles by which, when deflated, the unit can be quickly moved from one joint to another.

Other objects and advantages of the present invention will be apparent to those skilled in the art after a consideration of the following detailed description, taken in conjunction with the accompanying drawing:

Figure 1 is a cross section taken longitudinally through a pair of adjacent pipe sections and my improved testing device in place; and Figure 2 is a view looking towards the left in Figure 1.

In the drawing, the reference numeral 1 indicates one end of the pipe or pipe section while the reference numeral 2 indicates the adjacent end of an adjoining pipe section and the reference numeral 3 indicates in its entirety a pipe joining means. The present invention is not primarily concerned with any particular type of pipe joint, but for the purposes of illustration, the pipe sections 1 and 2 are shown as a part of a pipe line particularly adapted to transport gas flow in which case it is desirable that there be no obstructions or interruptions on the interior surfaces of the line. This requirement necessitates a joint, such as the one illustrated, in which all of the parts thereof are positioned on the exterior of the pipe sections. The pipe joint illustrated is commonly known as the Dresser coupling and is a type of bolted joint embodying a central sleeve 5 having marginally outturned or outwardly flared ends 6 and an inwardly directed radial projection 7. This projection serves to properly center the sleeve 5 in place and therefore necessarily spaces the adjoining pipe sections a small distance apart. While this space, which is indicated by the reference numeral 9, is not large, it is made use of in testing the joints and will be referred to later.

Clamping flanges 10 and 11 encircle the pipe ends 1 and 2 and each is provided with a circumferential recess 12 and a cylindrical lip 13 formed to overlie the outwardly flared portions 6 of the central sleeve. The clamping flanges 10 and 11 are also provided with strengthening webs 15 and apertures 16 which receive the clamping bolts 17. The recesses 12 contain suitable packing material 20 of which various compounds and materials are available at the present time. When the clamping bolts 17 are tightened the movement of the clamping flanges 10 and 11 serves to force the packing material 20 against the flared portions or ends of the central sleeve so that the packing material is forced into intimate contact with the interior of the adjacent pipe ends whereby to effectively form a tight joint.

It is to be understood that while we have described a particular type of bolted joint, other pipe joining means may be employed with our improved testing device which will now be described in detail.

A central annular rim 30 provided with radial walls 31 and 32 is preferably formed of metal or the like, although other rigid material may be employed if desired, and this rim serves to carry an inflatable tube or container 33 forming an annular fluid container.

Preferably, the air bag 33 is similar to an inner tube for pneumatic tires and is formed of rubber or other material possessing the required resiliency and flexibility. The air bag 33 is seated between the radial walls 31 and 32 of the central rim 30 but a portion of the air bag extends beyond the edges of the rim providing, in effect, flexible extensions thereof upon the outer circumference or periphery of which a flexible strip 36 is secured. Preferably this strip 36 is in the form of a cylindrical or circular section of rubber or other yielding material, and in order to protect the rubber tube 33 the sealing strip 36 is carried upon a section of canvas 37. This fabric carrier for the strip 36 has its edges permanently secured to the edges of the rim 30 in any manner desired as by small screws 40 or the like and allows the air bag 33 to be inflated to a higher pressure than would otherwise be possible.

While we have shown and described a protecting fabric carrier for the flexible strip 36 which encloses and protects the air bag 33, it is to be understood that the air bag itself may be provided with a flat circumferential portion which can efficiently serve the same purpopes as the sealing strip 36. An air valve 43 is provided for the purpose of inflating the air bag 33.

As intimated above, the present invention contemplates subjecting the space 9 between adjacent pipe ends to a fluid pressure to test the efficiency of the exterior joining means. As a means for directing pressure into this space the rim 30 is provided with a suitable radial opening to receive an air pipe or tube 45 (see Figure 1). This tube projects through the central portion of the air bag 33 at one point therein, and for this purpose the bag or container 33 is provided with a suitable tubular portion 46 vulcanized or otherwise suitably joined to the air bag and arranged to receive the air pipe 45. The air pipe extends through the canvas carrier 37 and has at its outer end a suitable nozzle 48 which is arranged to project slightly into the space 9, primarily for the purpose of easily locating the testing device promptly with respect to the pipe ends.

For the purpose of conveniently and easily handling the testing unit, arms 52 and 53 are rigidly secured to the rim 30 transversely thereof, these arms projecting forward and rearward beyond the rim and terminating in angular extensions 54 and 55. These extensions have bifurcated ends to receive supporting rollers 60 suitably journaled thereon. If desired, suitable handle means 65 may also be rigidly secured to the rim 30 and of a length sufficient to enable the operator to conveniently shift the testing unit from one joint to another, either with the operator on the inside of the pipe or from the outside if the pipes are of relatively small diameter. In this connection it will be observed that the angular extensions 55 and the air bag 33 are so proportioned and dimensioned that when deflated the overall diameter of the testing unit is only slightly smaller, preferably in the neighborhood of one-half inch where the pipes are thirty-six inches in diameter, thus allowing the weight of the testing unit to be supported on the rollers 60. When the air bag is inflated, the rollers 60 are lifted a slight amount above the invert of the pipe sections. The air pipe 50 is representative of any suitable source of air, both for testing purposes and for inflating the tube 33.

The method of testing a pipe joint when using the above described device is substantially as follows. After the joint 3 has been made, the testing unit is rolled along the bottom or invert of the pipe line until the nozzle 48 occupies a position leading into the space 9 between adjacent ends of the pipe sections. Air pressure from any suitable source, such as is indicated by the reference numeral 50, is applied to the valve 43 to properly inflate the air bag 33. The inflation of the bag presses the resilient mat or strip 36 firmly against adjacent ends of the pipe sections so as to seal off the space 9 from the interior of the pipe line. Next air pressure is applied to the air pipe 45, as indicated in Figure 1, and air under pressure is admitted into the space 9. For this purpose the air pipe 50 may be provided with a valve 70 and a gauge 71.

When a suitable pressure has been obtained, as indicated by the gauge 71, a soap solution is applied to the exterior of the pipe ends and to the pipe joint 3, this solution being so applied as to wet all exterior surfaces. Should the joint 3 be defective and allow air from the space 9 to leak out this condition will be immediately noticed by the operator due to the formation of bubbles. Preferably a substantially constant pressure is maintained in the space 9.

In this connection it is to be noted that an absolutely tight joint or connection between sealing strip 36 and the adjacent air tight ends is not absolutely necessary. It is necessary, however, that the air pressure to which the air space 9 is subject shall be at least as great as the maximum working pressure in the completed pipe line. Therefore, if sufficient air pressure is available to the air line 50 a small leakage of air from the sealing strip 36 will not vitiate the test in any manner.

It is also possible to test the joint by subjecting the space 9 to a given pressure, then closing the valve 70 and noting whether or not the pressure indications on the gauge 70 become less. This test, however, requires that a tight connection be maintained between the strip 36 and the adjacent pipe ends, otherwise leakage occurring at this point will cause the gauge readings to fall when there is actually no leakage at the joint 3.

In the above specification we have described the application of our invention to a mechanical coupling between two pipe ends. The invention may equally well be applied to a welded joint or to the joint between two fittings or between a pipe end and a connected fitting. The theory is to apply air pressure to one side of the joint or part the tightness of which is in question. Obviously the testing device and method may be employed to explore or test any part of the pipe. It will also be apparent that instead of using a flat strip or mat 36, an arched strip or mat may be used to provide an annular channel through which air pressure is applied to the part to be tested. While the use of the rigid rim 30 is preferred, as facilitating the desired seal upon inflation of the air container, this is not essential in all cases provided the container is sufficiently inflated to seat the sealing surface thereof tightly against the pipe ends. In its broader aspects, our invention comprehends the use of the container without the rim, in cases which permit of such use.

The device of our invention may be used with a vacuum for indicating leakage, and also it may be employed for drawing a sealing material into the joint if desired. That is to say instead of applying pressure above atmosphere by way of connection 45 pressure below atmosphere may be created in space 9 by evacuation of the same through connection 45.

While we have shown and described in detail above the preferred structural embodiments of the present invention it is to be understood that there are changes and modifications which can be utilized without departing from the spirit of the present invention. It is our purpose, therefore, that all such changes and modifications shall be included in the present invention as defined by the appended claims.

What we claim, therefore, and desire to secure by Letters Patent is:

1. Apparatus for testing pipe joints wherein the pipes are connected by exterior joining means, comprising an annular fluid tight container of continuous cross-section having flexible walls, sealing means carried circumferentially by said container and adapted for engagement with the two adjacent pipe ends of the joint to be tested, means for supplying fluid under pressure to said container to press said sealing means against said pipe ends in substantial leak-tight relation therewith, and means for subjecting the space between said pipe ends and said means to a testing pressure.

2. Apparatus for testing pipe joints comprising an expansible and substantially toroidal fluid container having flexible walls and a flat outer circumferential surface of substantial width, valve means permitting the container to be inflated to press the flat outer circumferential surface thereof against spaced and adjacent pipe ends in substantially leak-tight relation therewith and bridging the space between the pipe ends, and means including a tube extending through said container and adapted to be placed in communication with the space between adjacent pipe ends for the purpose of subjecting said space to fluid pressure.

3. Apparatus for testing pipe joints comprising a rigid annular rim, a circular gas container carried by said rim and provided with flexible walls and a flat outer circumferential surface of appreciable width and adapted to contact with the interior surface of both adjacent pipe ends, means for inflating said container to press said circumferential surface against the adjacent pipe ends in leak-tight relationship therewith, and means passing through said rim and said container for subjecting the space between adjacent pipe ends and said circumferential surface to fluid pressure.

4. Apparatus for testing pipe joints comprising an annular flexible and fluid tight container having an open, central portion and adapted to be inserted on the interior of the pipe and to seal off the space between adjacent pipe ends from the interior of the pipe, means for inflating the container, and means for subjecting the space between adjacent pipe ends and the container to fluid pressure.

5. Apparatus for testing pipe joints comprising an annular rim, a circular air container carried by said rim and having flexible walls, said container including a substantially flat tread portion adapted when said container is inflated to be firmly pressed against the interior surface of adjacent pipe ends, a separate tube carried by said rim and passing through said container and said tread portion so as to extend into the space between the adjacent pipe ends, and means placing said tube in communication with a source of air pressure to apply a testing pressure to the space between the adjacent pipe ends.

6. Apparatus for testing joints of pipes comprising a rigid rim having a diameter smaller than the interior diameter of the pipe to be tested, a circular air container having flexible walls and carried by said rim, said container comprising a substantially flat strip disposed in a circle having a diameter substantially equal to the diameter of the pipe to be tested and a flexible carrier for said strip formed to embrace the outer circumferential portion of said flexible walls of the air container, means securing said carrier to said rim, an air connection for said container whereby the same may be inflated, and an air connection passing through said strip whereby the space between adjacent pipe ends can be subjected to a testing pressure when the container is inflated to firmly press the strip in overlapping relation against adjacent pipe ends.

7. In apparatus for testing pipe joints and the like, an inflatable and expansible air tight container of continuous cross-section, said container having a circumferential sealing surface adapted to bridge the joint being tested and provide substantially fluid tight seals at the sides thereof when the container is inflated, means for admitting fluid under pressure into the container for inflating the latter, and means for admitting testing fluid under pressure between the central portion of said surface and the joint.

8. In apparatus for testing pipe joints and the like, an inflatable and expansible air tight container of continuous cross-section, said container having a circumferential sealing surface adapted to bridge the joint being tested and provide substantially fluid tight seals at the sides thereof when the container is inflated, means for admitting fluid under pressure into the container for inflating the latter, and a tube extending through the container and opening through the sealing surface substantially centrally of said surface.

9. In apparatus for testing pipe joints and the like, a rigid rim, an inflatable and expansible air tight container of continuous cross-section mounted upon the rim concentric therewith, the circumferential surface of the container remote from the rim providing a sealing surface adapted to bridge the joint being tested and provide substantially air tight seals at the sides thereof when the container is inflated, means for admitting fluid under pressure into the container for inflating the latter, and a tube accessible exteriorly of the container and opening through the central portion of the sealing surface of said container.

MATTHEW G. MARKLE.
JAMES W. LEEMING.